United States Patent
Siegeritz (10) Patent No.: US 10,800,183 B2
(45) Date of Patent: Oct. 13, 2020

(54) METHOD OF FAIL-SAFE COLOR TRANSFORMATION

(71) Applicant: HEIDELBERGER DRUCKMASCHINEN AG, Heidelberg (DE)

(72) Inventor: Helmut Siegeritz, Kronshagen (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 16/502,086

(22) Filed: Jul. 3, 2019

(65) Prior Publication Data

US 2020/0023650 A1   Jan. 23, 2020

(30) Foreign Application Priority Data

Jul. 19, 2018   (DE) .................. 10 2018 212 058

(51) Int. Cl.
  *B41J 2/21*   (2006.01)
(52) U.S. Cl.
  CPC .................... *B41J 2/2142* (2013.01)
(58) Field of Classification Search
  CPC .. B41J 2/2142; B41J 2025/008; B41J 2/2139; B41J 2/2146; H04N 1/4015; H04N 1/40
  See application file for complete search history.

(56) References Cited

U.S. PATENT DOCUMENTS

| | | | | |
|---|---|---|---|---|
| 5,508,826 A | * | 4/1996 | Lloyd ................. | H04N 1/6033 347/19 |
| 6,575,095 B1 | | 6/2003 | Mahy et al. | |
| 2008/0309704 A1 | * | 12/2008 | Kondo ................. | B41J 29/393 347/19 |
| 2015/0290930 A1 | * | 10/2015 | Shibata ................. | B41J 2/0451 347/9 |
| 2015/0336381 A1 | | 11/2015 | Kyoso et al. | |

FOREIGN PATENT DOCUMENTS

| | | |
|---|---|---|
| DE | 69416892 T2 | 7/1999 |
| DE | 60003373 T2 | 5/2004 |
| DE | 102014219965 A1 | 4/2016 |
| DE | 102016224303 A1 | 6/2018 |

* cited by examiner

*Primary Examiner* — Bradley W Thies (74) *Attorney, Agent, or Firm* — Laurence A. Greenberg; Werner H. Stemer; Ralph E. Locher (57) ABSTRACT

A method for reducing the effect of defective printing nozzles in a multicolor printing process on an inkjet printing machine. A computer creates a color transformation table that, for every process color of the inkjet printing machine, includes a replacement combination of the respective other process colors with a minimum color distance to the process color in question. The color transformation table is used to compensate for a defective printing nozzle. The color transformation table is created by printing and measuring a test chart with all process colors and interpolated by the computer. The color transformation table is then optimized to avoid undesired transitions between supporting points of the color transformation table and the resultant color transformation table accordingly contains process color combinations with minimum sensitivity to defective printing nozzles and the optimized table is used to carry out the multicolor printing operation on the inkjet printing machine.

10 Claims, 5 Drawing Sheets

METHOD OF FAIL-SAFE COLOR TRANSFORMATION

CROSS-REFERENCE TO RELATED APPLICATION

This application claims the priority, under 35 U.S.C. § 119, of German application DE 10 2018 212 058.7, filed Jul. 19, 2018; the prior application is herewith incorporated by reference in its entirety.

BACKGROUND OF THE INVENTION

Field of the Invention

The invention lies in the printing field and, more specifically, in the technical field of digital printing.

The invention deals with a method for reducing the effect of defective printing nozzles in a multicolor printing operation in an inkjet printing machine.

In many inkjet printing machines known in the art, a printing material is guided past one or more rows of printing nozzles that are stationary relative to the machine during the printing operation and jet ink droplets of an order of magnitude of a few picoliters onto a moving printing material. Multicolor inkjet printing machines include several successive printing units that print inks of different colors. The printed image is created on the printing material by a suitably timed actuation of the printing nozzles in accordance with the halftone that is used. In the process, the intensity of a printing ink at a location in the print may in most cases be controlled by varying the number of droplets per unit area and by incrementally varying the drop size.

Deposits in the printing nozzles may on the one hand reduce the volume of the jetted droplets and, on the other hand, cause the direction of the trajectory of the droplets to change. For instance, if a homogenous solid area is to be printed by means of a single printing ink, the effect is that a light line is created underneath an affected nozzle and additionally a darker line may form next to it. If several printing inks are used in the print, for instance in an area of a homogenous gray that is composed of cyan, magenta, and yellow inks, a lighter reddish line may form in the completed print underneath a defective cyan nozzle because magenta and yellow relatively predominate along this line.

The color impression a human observer has of a printed surface is colorimetrically described by a triplet of numbers, for instance by XYZ or Lab. This corresponds to the presence of three types of color receptors in the eye of a trichromatic standard observer. If more than three printing inks are involved in a printing operation, there usually exist a number of ways of creating a specific color impression. The definition of the corresponding degrees of freedom for the transformation of the image data from a device-independent color space to a device-dependent color space, for instance form XYZ or Lab to CMYK or CMYKOGV will in the following description be referred to as color composition.

In a CMYK print, for instance, the one available degree of freedom may be used for various purposes by using the black printing ink to different extents in addition to cyan, magenta, and yellow. In a print using 7 different inks, there are even 4 degrees of freedom for creating a color impression. For the method described herein it is essential that a color composed of varying ink proportions in different ways has different reactions to fluctuation in the contributing inkjet nozzles.

In an extreme case, deposits in a nozzle may cause the nozzle to fail completely, which means that no ink at all is applied to this location on the printing material. A more common phenomenon is, however, that the drop size is reduced to a greater or lesser extent. These effects are often subject to fluctuations over time; for instance, deposits in a nozzle that functions only to a limited extent may be flushed out after a period of uninterrupted operation, causing the nozzle to return to its original drop size and the original trajectory.

To reduce the problem of deposits in the printing nozzles, maintenance cycles involving an intensive operation of all printing nozzles are carried out at regular intervals. Even though specific printing nozzles may be used only extensively or not at all during a specific print job, such a rinsing operation may frequently prevent deposits from forming in a nozzle.

In addition, ink may be pressed through the printing nozzles at an increased pressure for maintenance purposes. An external application of cleaning liquids containing solvents in turn allows deposits on the printing nozzle openings to be dissolved.

Printing nozzle variation due to manufacturing tolerances may be counteracted by an individual calibration using adapted electric pulse forms for the respective piezoelectric elements. This process may to some extent be used to compensate for variations over time.

However, the aforementioned measures cannot remedy the problem that fluctuation in the throughput of the nozzles in between two maintenance cycles affects the quality of the print.

In the field of color composition in printing operations with more than three inks there are well-established methods for minimizing ink consumption, among them GCR (gray component replacement). Although this reduces print costs by reducing the proportions of chromatic colors in favor of black, improves the drying behavior, and increases image sharpness, it has a downside, as it causes the image impression to be highly sensitive to fluctuation in the nozzles that apply the black ink.

Color composition involving a limited use of GCR as it is done in lithographic offset printing, for instance a 50% replacement of the CMY proportions, may reduce the undesired effects. Nevertheless it is still not ideal because such a color composition predominantly focuses on a specific ratio of the printing inks to one another rather than on the visibility of defects.

If a printing nozzle defect cannot be amended in this way at all, the most common attempt at compensating for the defect is to use other locally neighboring printing nozzles. Apart from compensation by immediately neighboring printing nozzles that jet an increased amount of ink to attempt to eliminate the defect, another common approach in multicolor printing is to conceal the defect as far as it is possible by means of the remaining printing nozzles that print the non-affected colors.

German published patent application DE 10 2014 219 965 A1 discloses a method for compensating for missing printing nozzles in an inkjet printing machine comprising the steps of calculating all reduced color profiles resulting from the process colors in use with a respective process color missing, detecting a nozzle failure of a printing nozzle printing one of the process colors while a print job is being carried out, selecting the suitable color profile as a function of the missing process color and determining the target color locations at the places of the failed printing nozzle, determining the replacement color locations from the selected color profile with a minimum color distance to the target color locations at the places of the failed printing nozzle, and continuing the print job by means of the newly determined composition of the remaining process colors at the places of the missing printing nozzle. However, a disadvantage of this approach is that the first step always is to carry out a more or less complex detection process to identify a defective printing nozzle in the first place and subsequently to be able to compensate for it.

SUMMARY OF THE INVENTION

It is accordingly an object of the invention to provide a color transformation method which overcomes the above-mentioned and other disadvantages of the heretofore-known devices and methods of this general type and to provide a fail-safe inkjet printing process that is as robust as possible in terms of printing nozzle quality fluctuations.

With the foregoing and other objects in view there is provided, in accordance with the invention, a method for reducing the effect of defective printing nozzles in a multi-color printing process on an inkjet printing machine by means of a computer, the method comprising:

creating with the computer a color transformation table that, for each process color of the inkjet printing machine, includes a process color combination of respective other process colors with a minimum color distance to the process color in question, the color transformation table being created by printing and measuring a test chart with all process colors and interpolated by way of the computer;

using the color transformation table to compensate for a defective printing nozzle;

optimizing the color transformation table with the computer to avoid undesired transitions between supporting points of the color transformation table and to form an optimized color transformation table containing process color combinations with minimum sensitivity to defective printing nozzles; and using the optimized color transformation table by the computer to carry out the multicolor printing process on the inkjet printing machine.

In other words, the objects of the invention are achieved by a method for reducing the effect of defective printing nozzles in a multicolor printing process on an inkjet printing machine by means of a computer. The computer creates a color transformation table that, for every process color of the inkjet printing machine, includes a replacement combination of the respective other process colors with a minimum color distance to the process color in question, wherein said color transformation table is used to compensate for a defective printing nozzle. The method is characterized in that said color transformation table is created by printing and measuring a test chart with all process colors and interpolated by means of the computer, and in that the color transformation table is optimized by the computer in such a way that undesired transitions between supporting points of the color transformation table are avoided and the resultant color transformation table accordingly contains process color combinations with minimum sensitivity to defective printing nozzles and is used by the computer to carry out the multicolor printing operation on the inkjet printing machine. The core aspect of the method of the invention is that in contrast to the prior art, where a replacement color or a combination of remaining process colors that are not missing is used to compensate for a missing nozzle, from the beginning, the color transformation table is designed in such a way that when a specific color is missing due to a defective printing nozzle, the effect on the print to be created is minimized. Thus the method of the invention is not reactive but proactive inasmuch as it optimizes the color transformation process that is necessary for the printing operation before a defective printing nozzle is identified. In general, the color transformation table is in the form of an ICC profile, which is today's method of choice for color space transformation for instance between CMYK (cyan, magenta, yellow, key) and a machine-dependent LAB (Lab) color space.

A preferred further development of the method of the invention in this context is that, to create the color transformation table by means of the computer, the proportion of the process color to be replaced equals zero for every replacement color combination. Equaling zero means that the assumption is made that the nozzle that prints the corresponding process color has failed. This represents an extreme case because it is assumed that the corresponding defective printing nozzle does not print at all and therefore no longer contributes the corresponding process color to the print to be created. However, what needs to be taken into consideration is that most operators of inkjet printing machines will simply switch off printing nozzles whose printing behavior exceeds specified tolerances and compensate for them as missing nozzles that do not contribute to the print at all.

A preferred further development of the method of the invention in this context is that, to create the color transformation table by means of the computer, the proportion of the process color to be replaced is greater than zero for every replacement color combination. In this context, greater than zero means that the defective printing nozzle has not failed completely but prints a reduced volume or at an angle. Whether this approach is implemented depends on the respective compensation strategy of the operator. In principle, defective printing nozzles that only print a reduced volume or at an angle are much more common than printing nozzles that have failed completely. Yet the fact that they are frequently switched off relativizes this statement. Therefore a calculation of the replacement color combinations with a proportion greater than zero of the process color to be replaced will only become relevant either if printing nozzles that have not failed completely are not switched off or if printing nozzles whose printing performance is still within tolerances are intentionally to be compensated for in terms of the smaller extent of their deviation from the desired behavior.

A preferred further development of the method of the invention in this context is that in the case of a six or seven-color print, the number of supporting points in the color transformation table is reduced in comparison to a four-color print. In a printing operation that uses more than four colors, usually six or seven colors, the color transformation table will consequently be more complex. As the number of supporting points rises exponentially, the result is that there are much higher memory space requirements for such a color transformation table. To reduce the memory space requirements, the number of supporting points in such a six or seven color print is reduced. Of course this has to be done in a way that ensures that the table still covers the widest possible range of the color spaces to be transformed.

A preferred further development of the method of the invention in this context is that the number of supporting points in a six or seven color print is reduced by dispensing with supporting points in which the value of the black process color is not lower than one of the other process color proportions or by dispensing with supporting points of complementary process colors that together must not form the two largest proportions in a process point. These are two suitable approaches to reducing the memory space requirements for six or seven color printing. In both approaches the supporting points that are dispensed with are of minor importance to a correct color space transformation and to a representation of the desired LAB color space by the process colors in the CMYK color space, respectively. Thus it makes sense that they are the first to be dispensed with to reduce the memory space requirements of the color transformation table.

A preferred further development of the method of the invention in this context is that the test chart that is used is a CMYK test chart that includes all process colors that are present and all combinations of process color proportions of 0%, 30%, 60%, and 100%, and in which those combinations of process color proportions are left out whose process color proportion total is above an allowed total area coverage. To create the color transformation table, a test chart that contains all CMYK process colors needs to be printed and measured. The test chart contains both CMYK solid areas and halftones with process color proportions of 0, 30, and 60% as well as combinations of the individual process colors with one another resulting from overprinting. After printing, measurements are taken in the test charts and the test charts are digitized and analyzed by means of the computer. Due to the measurement, the color transformation table may be created because for every defined use of process colors such as CMYK in the test chart there is a corresponding resultant measured LAB value. Based thereon, the color transformation table in the form of an ICC profile may be created in a corresponding way. Every pair of combination values of process color combination value and resultant LAB value represents a supporting point pair. Since we are dealing with an inkjet printing process, the specific conditions and restrictions of inkjet printing need to be factored in. One of these restrictions relates to the maximum overprinting of different process colors, i.e. inks in the case of inkjet printing. In contrast to offset printing, the overprinting of different inks is only possible up to a specified permitted area coverage total. Therefore, process color combinations that exceed this permitted area coverage total must not be printed in the CMYK test chart. If color values in the corresponding CMYK/LAB color spaces cannot be covered by the test chart, they will later have to be added by the computer for instance by interpolation.

A preferred further development of the method of the invention in this context is that supporting points outside the gamut are treated separately by the computer by gamut clipping or gamut mapping and are mapped to supporting points that are attainable within the gamut. It is possible that the corresponding color space transformations result in LAB color space areas that cannot be reproduced by the process color space, i.e. by the process colors of the inkjet printing machine. Such supporting points that are outside the gamut need to be reproduced by supporting points that can be achieved within the gamut. This is done by the computer in a corresponding way using various tools such as gamut clipping or gamut mapping.

A preferred further development of the method of the invention in this context is that to reduce the required computing time and memory space, the computer at first only determines the supporting points of the gray axis with a compensation calculation and then fills the color transformation table in a radially outward direction starting from the gray axis, wherein the respective neighboring supporting points that are already available and the sensitivities to defective printing nozzles contribute to an assessment of the suitability of further supporting points. This is a preferred approach to reducing the required computing time and the memory space the computer needs in order to execute the method of the invention in a corresponding way. The points at the gray axis in the color space are the first to be determined because they are the most important ones for a color space transformation. An important aspect is that when the color transformation table is filled from the center towards the outside, potential new neighboring supporting points are analyzed in terms of their suitability for use in the color transformation table; for this purpose, corresponding neighboring supporting points and their sensitivities to defective printing nozzles are used as assessment criteria.

Other features which are considered as characteristic for the invention are set forth in the appended claims.

Although the invention is illustrated and described herein as embodied in a fail-safe color transformation method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Mutually corresponding elements have the same reference symbols throughout the drawing figures.

DETAILED DESCRIPTION OF THE INVENTION

Figure 1:
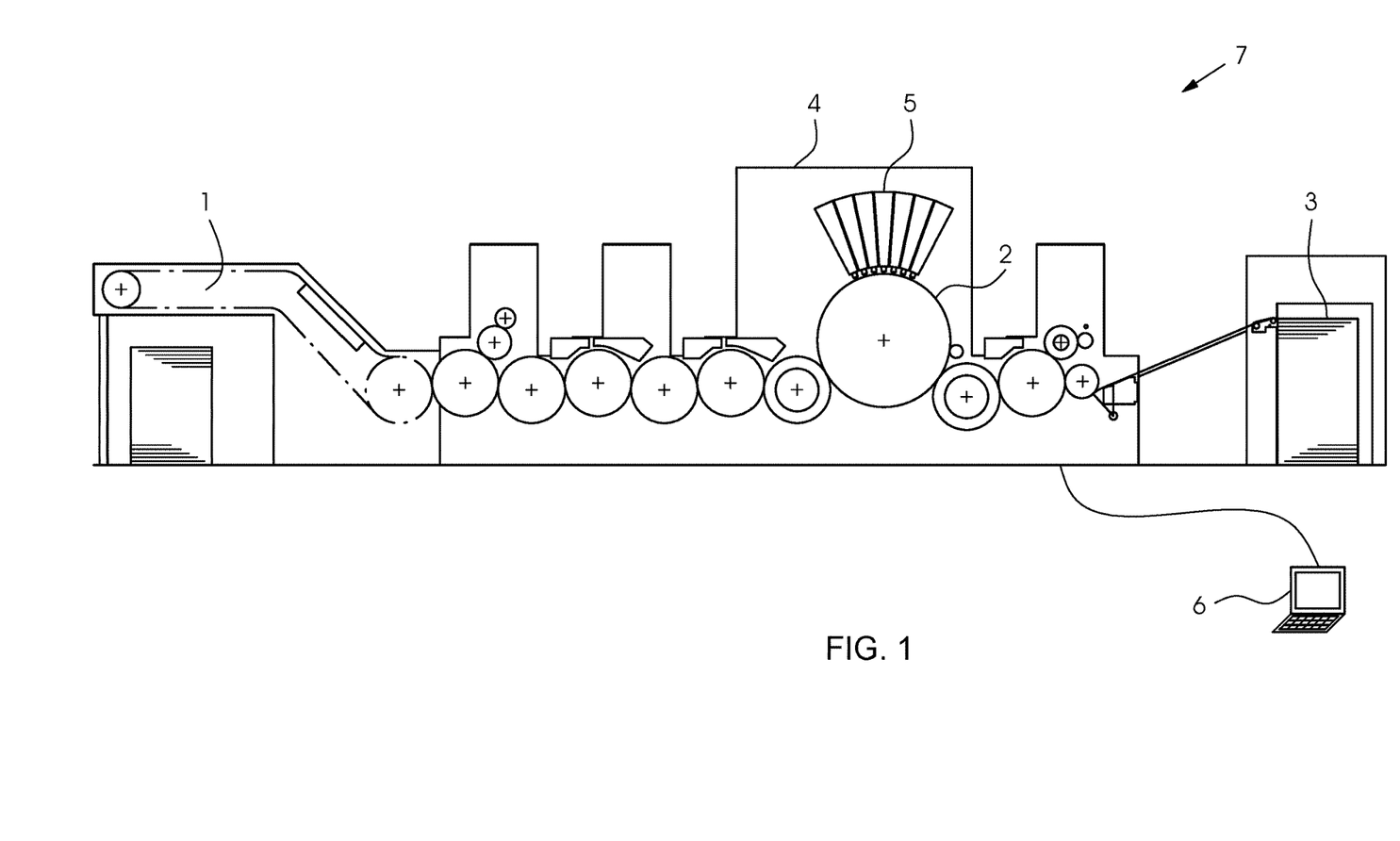
FIG. 1 illustrates an example of the design of a sheet-fed inkjet printing machine.

The field of application of the preferred exemplary embodiment is an inkjet printing machine 7. Referring now to the figures of the drawing in detail and first, particularly, to FIG. 1 thereof, there is shown an exemplary embodiment of the fundamental design of such a machine 7, including a feeder 1 for feeding the printing substrate 2 to the printing unit 4, where it receives an image printed by print heads 5, and a delivery 3. The machine is a sheet-fed inkjet printing machine 7 controlled by a control unit 6. While the printing machine 7 is in operation, individual printing nozzles in the print heads 5 in the printing unit 4 may fail as described above.

Figure 2A:
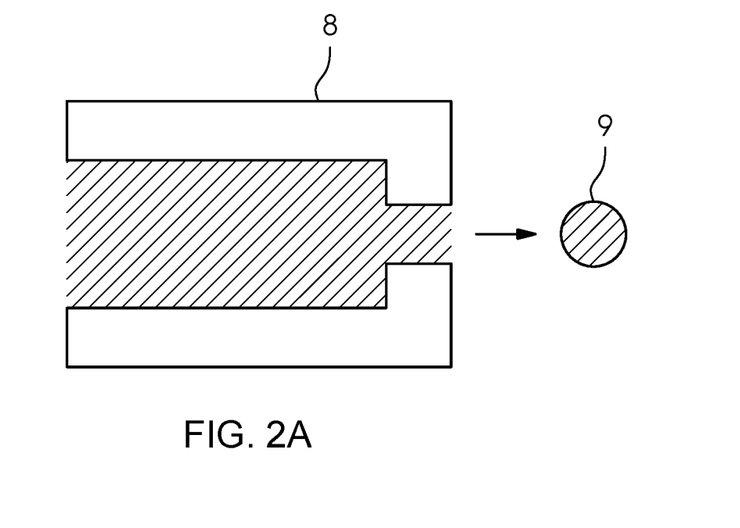
FIG. 2A is a schematic side view of an ink jet printing nozzle.
Figure 2B:
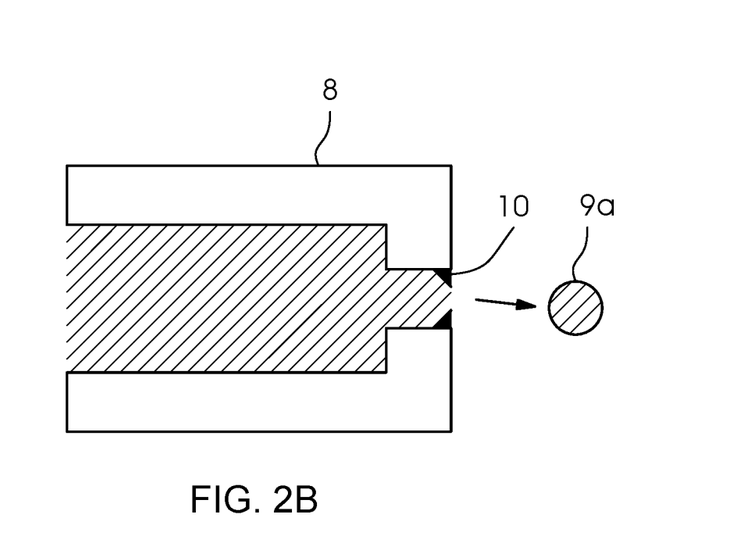
FIG. 2B illustrates an example of a reduced ink drop volume as a result of deposits on the printing nozzles.

This is schematically shown in FIGS. 2A and 2B. FIG. 2A illustrates a printing nozzle 8 that jets a normal ink drop 9. In FIG. 2B, however, deposits have formed on the printing nozzle opening 10, causing the nozzle to jet an ink drop 9a that is too small.

Figure 3:
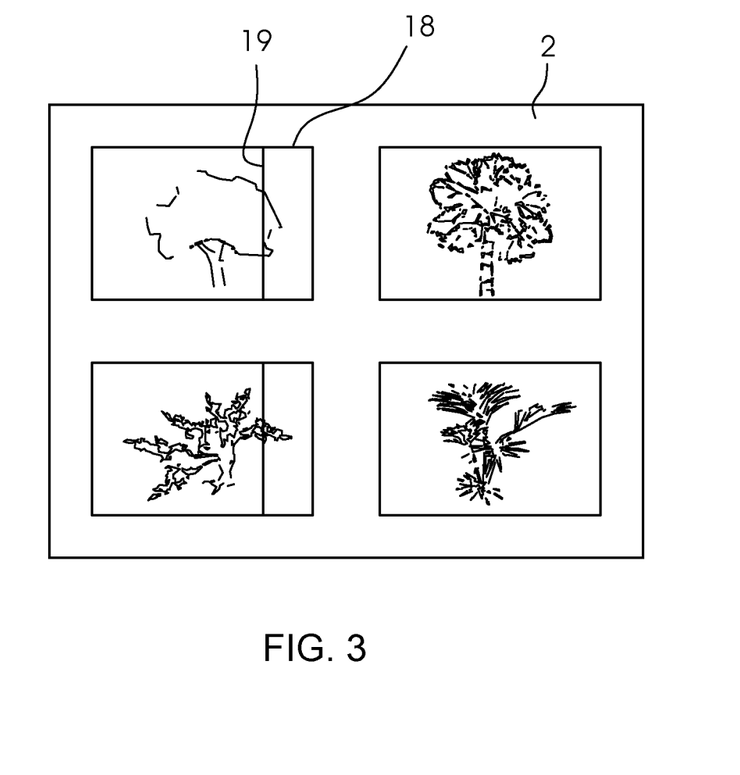
FIG. 3 illustrates a schematic example of a white line caused by a missing nozzle.

The results are white lines 19 or, in the case of multicolor printing, distorted color values. An example of such a white line 19 in a printed image 18 is shown in FIG. 3.

The object of the method described herein is to minimize the sensitivity of the print result 18 to fluctuations in printing nozzle throughput in all color channels by optimizing the color composition of multicolor inkjet printing operations. It should be understood that low printing cost or a short drying process are not the main aspects of this method.

Moreover, an important aspect for the method is to ensure that despite the special conditions, a representation of the required color transformation by a supporting point grid with interpolation, for instance in the Lab color space 11, does not lead to irregular color gradients between the saved supporting points. This means that the method precludes abrupt changes of the ink proportions between neighboring supporting points in the table. As a consequence, even for a 7-color print, the color transformation may be represented as an ICC profile of moderate size without creating artifacts when applied.

Figure 5:
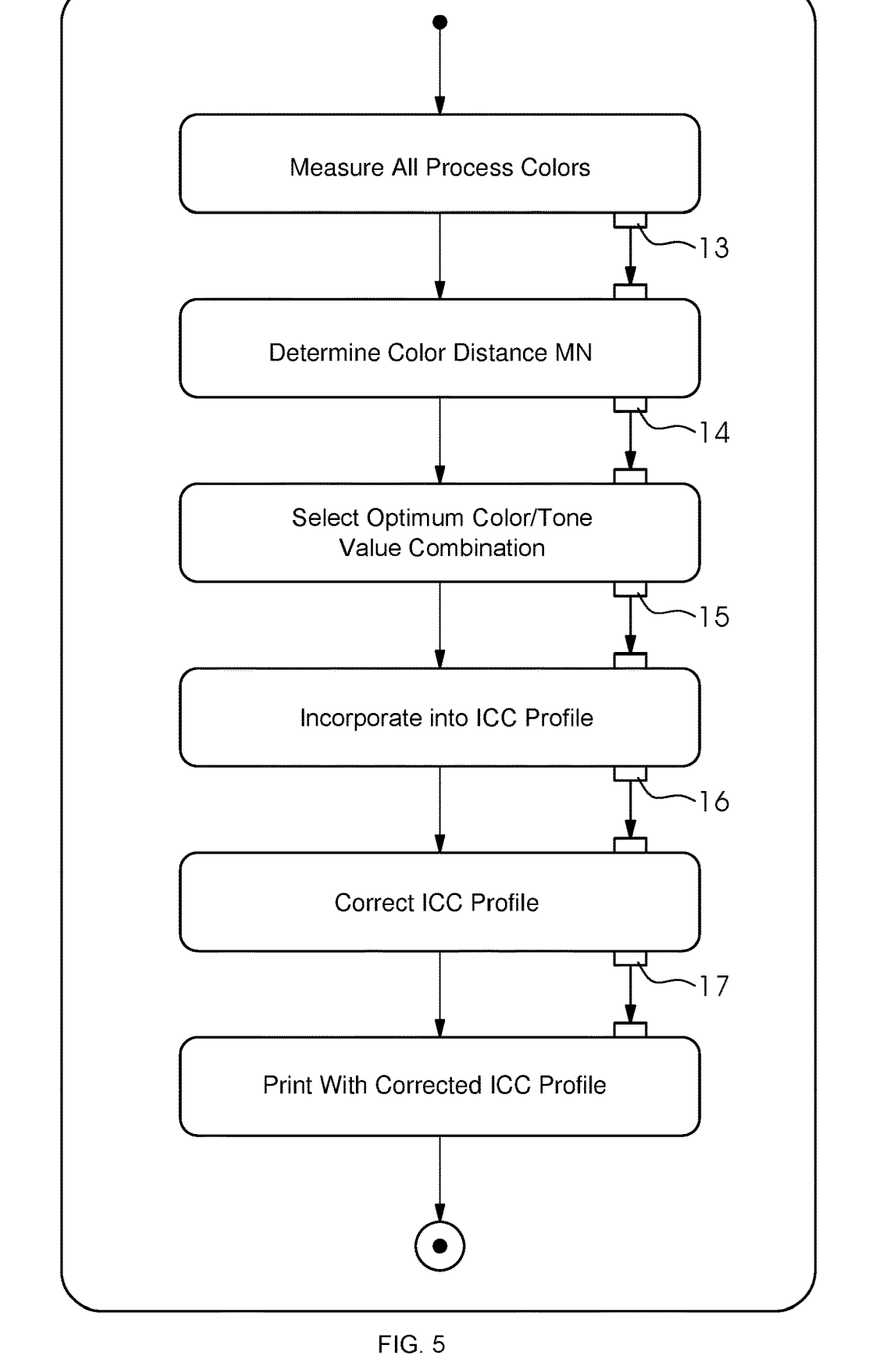
FIG. 5 is a flow chart of the method of the invention.

A flow chart of a preferred embodiment of the method of the invention is schematically shown in FIG. 5. The first step is to print a suitable test chart for the used number of printing inks 13 on the inkjet printing machine 7 and then to take colorimetric measurements of the corresponding process colors 13. The color patches of the test chart are defined in the device-dependent color space such as CMYK or 7c and in total, they, with their respective color proportions of the contributing inks, form a point-wise scanning of the n-dimensional process space. On the basis of the measured points, a suitable interpolation method may then be used to interpolate the entire transformation from the device-dependent color space to a device-independent color space such as XYZ or Lab as a good approximation for all points of the process space. The description of this transformation will be referred to as "process model" in the following description. For the purposes of the present method it is irrelevant whether a set of mathematical formulas with adapted coefficients is used or an n-dimensional table.

For a 4-color print with CMYK, the test chart is preferably standardized in accordance with ISO 12642-2 or IT8.7/4. If more than 4 print colors are involved, a very simple and coarse test chart may be created by all combinations of the ink proportions 0%, 30%, 60%, 100% in the color channels. In this process, combinations that have a proportion total above the allowed area coverage total of 350%, for instance, are eliminated. More detailed test charts refine a coarse scanning by additional points in relevant areas of the process space, thus providing a more accurate interpolation in these areas.

In a first preferred embodiment of the method, only a complete failure or clogging of printing nozzles 8 of the contributing color channels is considered. Since failures of printing nozzles 8 are rare events in view of the total number of printing nozzles 8, only a failure of a single color channel at a location of an image 18 to be printed is taken into consideration while the much rarer case of a simultaneous failure of two or more printing nozzles 8 of different color channels in the same location is neglected.

A failure of a printing nozzle 8 in a color channel means that only 0% is printed at the location in question instead of the specified ink proportion 9. When the process model is applied, a specific combination of ink proportions 9, i.e. a specific point in the process space results in a respective unmodified Lab point. Then one can successively set every one of the ink components to 0% and determine the color distance 14 between the resultant modified Lab point and the first Lab point. The Euclidean distance in DeltaEab or the more accurate distance in accordance with the DeltaE2000 formula may be used as the color distance 14, for example. The maximum of the distances 14 from the individual components is taken as the measure for the sensitivity of the ink combination in question to printing nozzle failures. Of all ink combinations that lead to a specific Lab point, it is those with a low sensitivity to printing nozzle failures that are especially suited for the color composition to be determined.

Figure 4A:
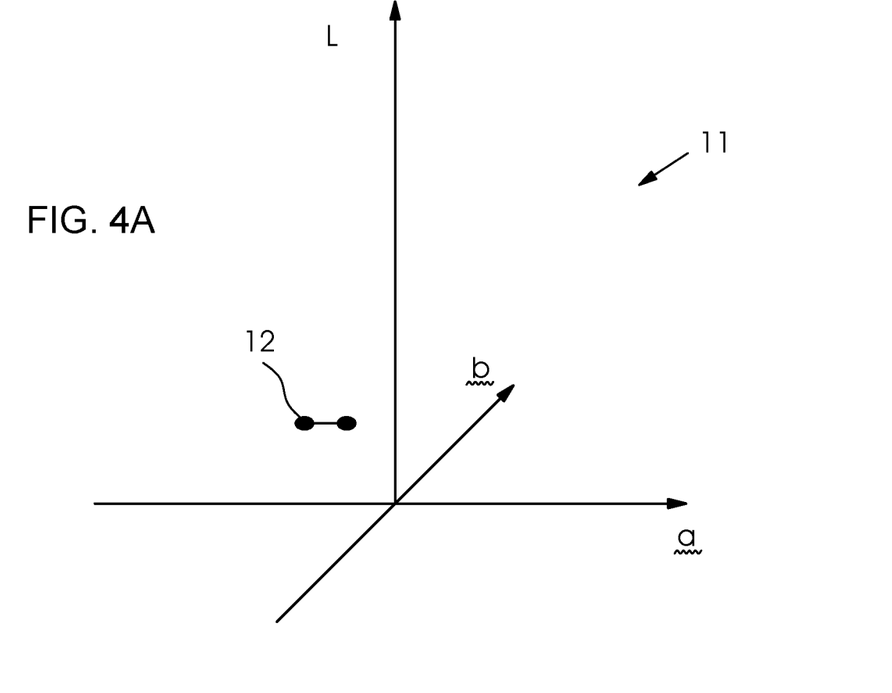
FIGS. 4A and 4B illustrate a color space transformation between Lab and process color space.
Figure 4B:
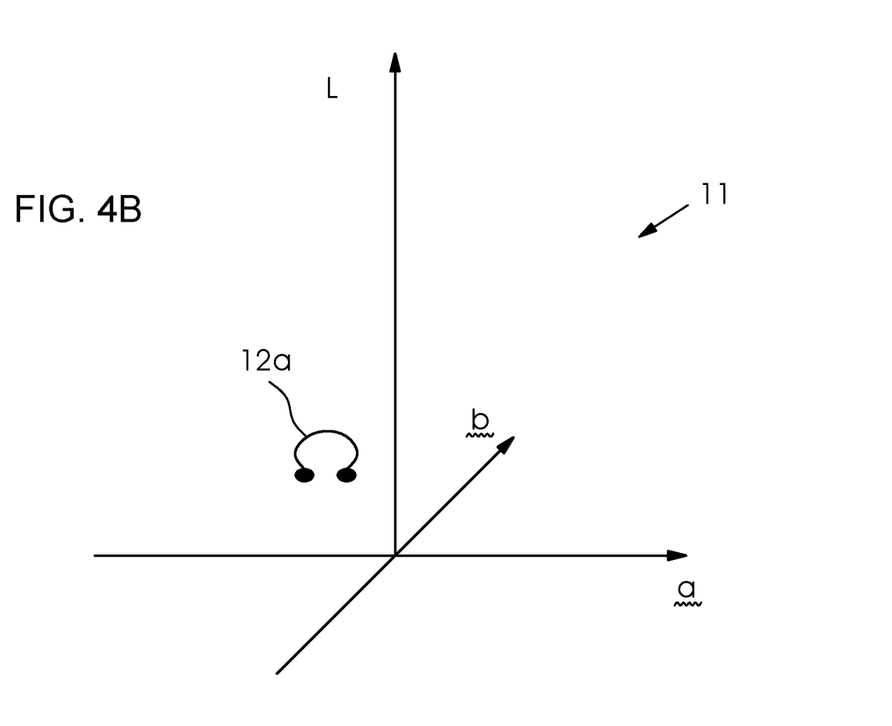

In a further step, a color transformation table 16, also known as an ICC table/profile 16, is determined to transform a device-independent color space, i.e. preferably the Lab space 11, into the process color space, in such a way that for every supporting point in the Lab table, the table 16 contains an associated ink combination that is minimally sensitive to printing nozzle failures 15. For a practical applicability of the method it is important to note that in many cases, such an ICC table 16 leads to unacceptable print results. This is easy to illustrate: for instance, take a 5-color printing operation using CMYK+green inks, especially Lab points in the lower brightness range of the achievable colors. Taking the maximum allowed area coverage total into consideration, a specific table point in the Lab color space 11 might lead to a process point that has high proportions of C, M, and Y. Yet for a neighboring table point, a process point with high proportions of M, green, and K might seem more suitable. If the color table 16/the ICC profile 16 was applied with interpolation between the supporting table points, due to the highly non-linear process characteristics, a transition between the two Lab points in an image to be printed would potentially not result in the desired transition 12 shown in FIG. 4a but instead in a transition 12a as shown in FIG. 4b. Thus the color composition needs to be prevented from changing abruptly from one table point to the next, even though this means to deviate from the respective local sensitivity optimum.

To be able to meet the requirements specified above, a large amount of points that scan the process space is generated in the memory of a computer. The computer may be a computer in a print preparation department or the control unit 6 of the inkjet printing machine 7. In the case of a 4-color process like CMYK, for instance, it is possible to make all ink proportion combinations between 0% and 100% available on the computer 6 in increments of 5%, for instance, together with a corresponding amount of Lab points determined by means of the process model and the values on the sensitivity to printing nozzle failures described above. In the given example, this requires $21^4$=194,481 points in CMYK and in Lab and a corresponding amount of sensitivity values. Suitable coding, for instance 8 bits per channel for CMYK, 3*10 bits for Lab, and 8 bits for the sensitivity is sufficient in terms of the required accuracy. Even a 5-color process may be handled in this way.

For 6 and 7-color processes, it is expedient to limit the amount of points by additional requirements to reduce the required memory space and computing time on the computer 6. Since the black ink in general has the strongest effect on a location of a color in the Lab space, one may for instance eliminate all process points in the original set whose black value is not below one of the other ink proportions. In addition, one may define, for instance, that chromatic printing inks opposite one another in the Lab space, for instance cyan and red or magenta and green together must not form the two largest proportions in a process point. Depending on the available resources, it is possible to add other pragmatic criteria for exclusion or to apply them even for 4-color or 5-color processes.

The original set of points may then preferably be sorted in accordance with the L value from the process model or indirectly with the aid of index arrays for L, a, and b in parallel. In this way, for a given supporting table point in Lab 11, all points of the original set that are located in the surroundings may be quickly found. For this purpose, a tolerance that is sufficiently wide for 5% increments in the original set is used for L, a, and b values. Due to the coarse gradation of the points of the original set, it is usually necessary to execute a reiteration for the identified points with the aid of the process module to achieve the desired color reproduction accuracy; in general, less than 0.5 DeltaE.

For Lab points that are outside the attainable color gamut or outside the color space of the process one cannot find any process points. These points are treated separately with the aid of known methods such as gamut clipping or gamut mapping and are mapped to attainable points. For points that are at the edge of the color gamut, for instance the point with 100% of cyan, in general, within the accuracy requirements, only a single reiterated candidate will remain; here, for lack of alternatives, the determined sensitivity does not have any effects.

An assessment criterion in terms of a desired vicinity of process points in a grid of supporting points defined in Lab 11 may, for instance, be a maximum difference in the ink channels; a short distance is to be striven for and corresponds to a desired small gradient of the values in the color separations.

A calculation of the optimum filling of the entire ICC table 16 at once with the described auxiliary conditions would be extremely complex in terms of the required memory space and computing time because for all table points, the reiterated candidates would have to be kept available and an extreme number of possible combinations would have to be considered. Therefore, at first only the points of the gray axis are determined in a compensation calculation; in this process, there may be additional limitations in terms of the symmetry of the used ink proportions. Starting from the gray axis, the ICC table 17 that has been post-corrected in this way is filled in a radially outward direction, a process in which the neighbors that are already available and the sensitivities contribute to an assessment of the suitability of candidate points.

A further embodiment of the method, one no longer deals with a complete failure of printing nozzles 8 but with a reduction of the droplet volume 9a. For this purpose, the reduction of the droplet volume 9a is approximately treated like a reduction of the corresponding ink proportion. This provides a way of treating a partial failure of printing nozzles 8 or a differential change of the printing nozzle throughput.

The following is a summary list of reference numerals and the corresponding structure used in the above description of the invention:
 1 feeder
 2 current printing substrate/current print sheet
 3 delivery
 4 inkjet printing unit
 5 inkjet print head
 6 computer
 7 inkjet printing machine
 8 printing nozzle
 9 normal ink drop jetted by a printing nozzle
 9a reduced ink drop jetted by a clogged printing nozzle
 10 deposits on a printing nozzle opening
 11 Lab color space
 12 desired transition between two supporting points in the Lab color space
 12a distorted transition between two supporting points in the Lab color space
 13 measured process colors color distance between target color value and color value of a
 14 defective printing nozzle
 15 optimum process color/tone value combination for compensation
 16 optimized ICC table/profile
 17 corrected ICC table/profile
 18 printed image on the current print sheet
 19 white line

The invention claimed is:

1. A method for reducing the effect of defective printing nozzles in a multicolor printing process on an inkjet printing machine by means of a computer, the method comprising:
creating with the computer a color transformation table that, for each process color of the inkjet printing machine, includes a process color combination of respective other process colors with a minimum color distance to the process color in question, the color transformation table being created by printing and measuring a test chart with all process colors and interpolated by way of the computer;
using the color transformation table to compensate for a defective printing nozzle;
optimizing the color transformation table with the computer to avoid undesired transitions between supporting points of the color transformation table and to form an optimized color transformation table containing process color combinations with minimum sensitivity to defective printing nozzles; and
using the optimized color transformation table by the computer to carry out the multicolor printing process on the inkjet printing machine.

2. The method according to claim 1, wherein, to create the color transformation table by the computer, a proportion of the process color to be replaced equals zero for every process color combination.

3. The method according to claim 1, wherein, to create the color transformation table by the computer, a proportion of the process color to be replaced is greater than zero for every process color combination.

4. The method according to claim 1, wherein the multicolor printing process is a six or seven-color print, and the method comprises reducing a number of supporting points in the color transformation table in comparison with a four-color print.

5. The method according to claim 4, wherein the number of supporting points in a six or seven-color print is reduced by dispensing with supporting points in which the value of a black process color is not lower than one other process color proportion or by dispensing with supporting points of complementary process colors that together must not form two largest proportions in a process point.

6. The method according to claim 1, wherein the test chart is a CMYK test chart that includes all process colors that are present and all combinations of process color proportions of 0%, 30%, 60%, and 100%, and the test chart leaves out those combinations of process color proportions whose process color proportion total lies above an allowed total area coverage.

7. The method according to claim 1, which comprises treating supporting points outside a gamut separately with the computer by gamut clipping or gamut mapping and mapping to supporting points that are attainable within the gamut.

8. The method according to claim 1, which comprises, in order to reduce a required computing time and memory space, first determining with the computer only the supporting points of the gray axis with a compensation calculation and then filling the color transformation table in a radially outward direction starting from the gray axis, wherein respective neighboring supporting points that are already available and sensitivities to defective printing nozzles contribute to an assessment of a suitability of further supporting points.

9. The method according to claim 1, wherein one of the process colors is black and the method further comprises eliminating process points in which a black value is not less than other ink proportions.

10. The method according to claim 1, which comprises defining that chromatic printing inks that lie opposite one another in a Lab space must not form largest proportions of colors in a given process point.

\* \* \* \* \*